United States Patent [19]
Hussaini

[11] Patent Number: 5,248,180
[45] Date of Patent: Sep. 28, 1993

[54] EXPANDABLE ENCLOSURE

[75] Inventor: Syed M. Hussaini, Sterling Heights, Mich.

[73] Assignee: The United States of America as represented by the Secretary of the Army, Washington, D.C.

[21] Appl. No.: 976,858

[22] Filed: Nov. 16, 1992

[51] Int. Cl.[5] .............................................. B60R 27/00
[52] U.S. Cl. ................................... 296/171; 296/165
[58] Field of Search .................. 296/26, 165, 171, 175

[56] References Cited

U.S. PATENT DOCUMENTS

| | | | |
|---|---|---|---|
| 2,136,130 | 11/1938 | Gorlenko | 296/175 X |
| 2,225,319 | 12/1940 | Rollo | 296/171 |
| 2,965,412 | 12/1960 | Henderson et al. | 296/171 |
| 3,137,041 | 6/1964 | Mullen | 296/171 X |
| 4,133,571 | 1/1979 | Fillios | 296/165 |
| 4,139,229 | 2/1979 | Cooper | 296/165 |
| 4,930,837 | 6/1990 | Marsh et al. | 296/26 X |

FOREIGN PATENT DOCUMENTS

1925258 11/1970 Fed. Rep. of Germany ...... 296/171

Primary Examiner—Joseph D. Pape
Attorney, Agent, or Firm—Peter A. Taucher; David L. Kuhn

[57] ABSTRACT

Disclosed is an expandable enclosure suitable for a cargo vehicle, a passenger vehicle, a stationary shelter or a stationary storage facility. An expansion unit is outwardly translatable from the enclosure by racks fixed to the unit. The expansion unit has first uprights fixed between the racks and second uprights fixed to the enclosure but having a sliding connection with the racks. Third uprights are disposed between the first and second uprights and are slidingly connected between the racks. The expansion unit may be mounted to the enclosure by the gears alone or may additionally be supported by a cantilever beam when the expansion unit is being deployed.

19 Claims, 6 Drawing Sheets

EXPANDABLE ENCLOSURE

GOVERNMENT USE

The invention described herein may be manufactured, used and licensed by or for the U.S. Government for governmental purposes without payment to me of any royalty thereon.

BACKGROUND AND SUMMARY

As modern warfare continues to evolve, armies must become increasingly mobile within their intended theaters of action. Various combat supporting operations, such as resupply functions, medical operations, or command and control functions must also become more mobile in order to service combat units. Consistent with the changes in modern warfare, the U.S. Army has recognized the utility of mobile work stations in the form of expandable trailers or expandable enclosures that can be easily transported and deployed as work centers for a crew of several persons. An expandable trailer is particularly adaptable for a mobile battlefield command and control center where such tasks as communications, control of unmanned vehicles, threat detection or electronic countermeasures could be performed. A mobile trailer could also provide housings or work areas for the previously mentioned support functions, as well as other support functions, such as mobile kitchens or battlefield repair sites.

I have designed a structure suitable and useful for an expandable trailer or mobile enclosure wherein an expansion unit deploys from either side of a trailer or mobile enclosure. Each expansion unit includes parallel racks by which the expansion units are translatably mounted to complimentary gears in the trailer or enclosure. The expansion unit has an opposed pair of panels, each panel comprising a set of uprights disposed between the parallel racks, one upright being fixed to the racks so that the one upright and the racks form part of the expansion unit's frame. The panels each include a linkage to control the relative movement between the uprights and include a flexible, accordion-like outer wall whose expansion or contraction is governed by the uprights and linkage.

DETAILED DESCRIPTION

Figure 1:
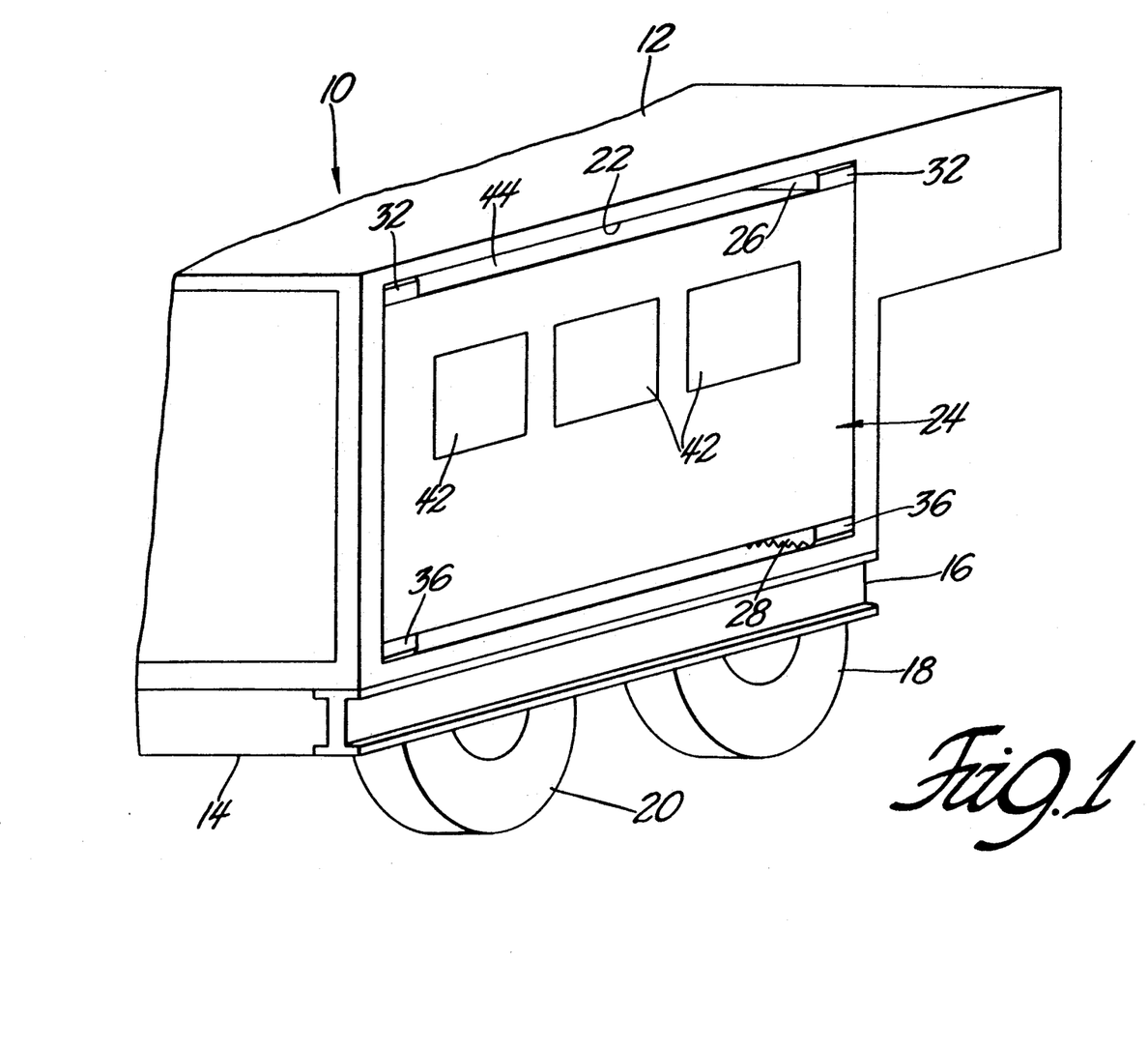
FIG. 1 is a partial perspective view of a trailer having an expansion unit in a retracted position. Hidden lines are omitted for clarity.
Figure 2:
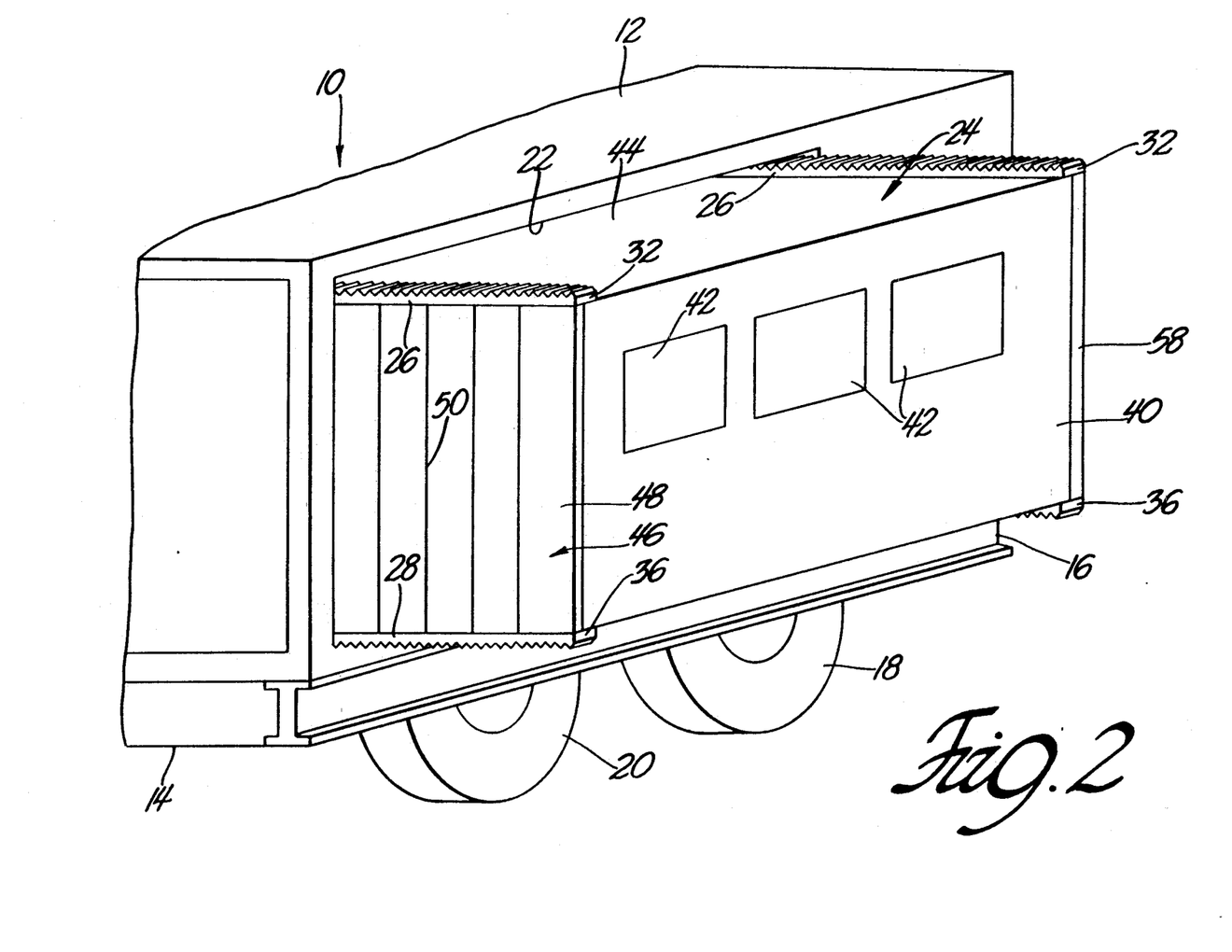
FIG. 2 is a partial perspective view of the trailer having the expansion unit in a deployed position. Hidden lines are again omitted for clarity.

In FIGS. 1 and 2 is shown a trailer 10 having body 12 mounted on frame members 14 and 16, and having wheel assemblies 18 and 20. It will be understood that trailer 10 is shown as an example only and that body 12 may accommodate passengers, cargo or both, and can also be a free standing human shelter or a storage facility. Body 12 defines a rectangular opening 22 in which fits expansion unit 24, the expansion unit shown in a retracted position in FIG. 1 and shown in a deployed position in FIG. 2. The expansion unit's lateral wall 40 is rigid and optionally defines openings such as windows 42. The expansion unit's roof panel 44 is also preferably rigid so as to add structural strength to expansion unit 24, but panel 44 may optionally be made of pliable or flexible material. The rear panel 46 and opposed front panel 52 (not shown in FIG. 2) are similar to each other and each has a flexible or pliable outer wall 48 that folds along folds or pleat lines 50 when expansion unit retracts from the FIG. 2 position to the FIG. 1 position. It may be preferred that outer wall 48 have more pleat lines than are shown in FIG. 2 so that wall 48 has a smaller width and protrudes less from the general plane defined by racks 26 and 28 when the wall is in a folded configuration.

Figure 5:
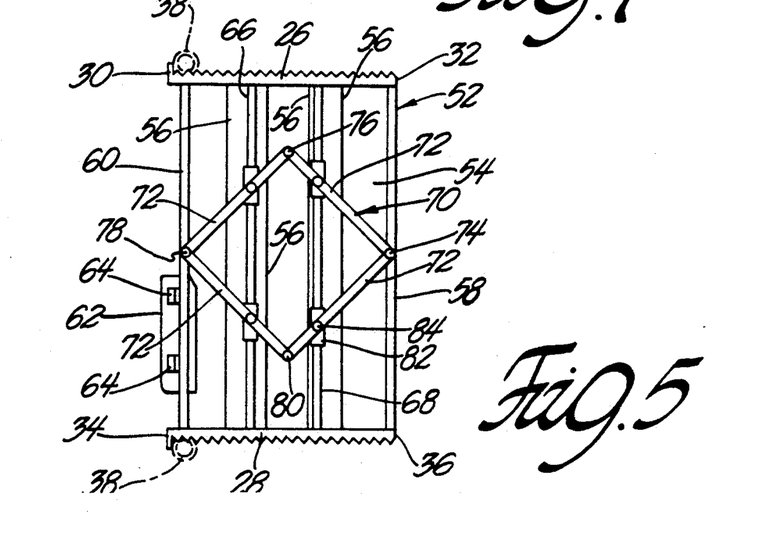
FIG. 5 shows a panel of the expansion unit.

Expansion unit 24 is laterally translatably mounted to trailer 10 by upper toothed racks 26 and lower toothed racks 28, these racks also being shown in FIG. 5. Racks 26 and 28 are fixed to expansion unit 24 and serve as part of the frame of the expansion unit. As best seen in FIG. 5, each upper rack 26 has an inboard end 30 and an outboard end 32 and each lower rack has an inboard end 34 and an outboard end 36. The racks are engaged and translated by gear 38 rotatably mounted inside trailer 10 at the four corners of rectangular opening 22, the gears being shown in FIGS. 3 and 5. FIG. 5 shows the positional relation between racks and gears when the racks and expansion unit 24 are in their most outboard, fully deployed positions.

FIG. 5 is a view of front panel 52 as seen from inside expansion unit 24, panel 52 being on the opposite end of expansion unit 24 from rear panel 46 in FIG. 2. Panel 52 has an outer flexible wall 54 bordered by rack 26, rack 28, an elongate outboard upright 58 and elongate inboard upright 60, wall 54 being foldable on pleat lines 56. Outboard upright 58 is a rigid rod fixed between racks 26 and 28 at the outboard ends thereof, whereby upright 58 acts as a frame member at an outer corner of expansion unit 24. Inboard upright 60 is fixed to a trailer structural member 62, which typically is disposed along one side of rectangular opening 22. Upright 60 is attached to structural member 62 by brackets 64, by welding, or by other known suitable means, whereby rack 60 is fixed relative to trailer 10.

Figure 8:
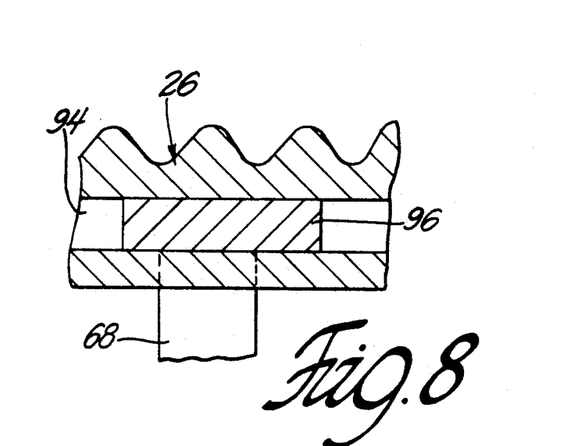
FIG. 8 is a view taken along line 8—8 in FIG. 9.
Figure 9:
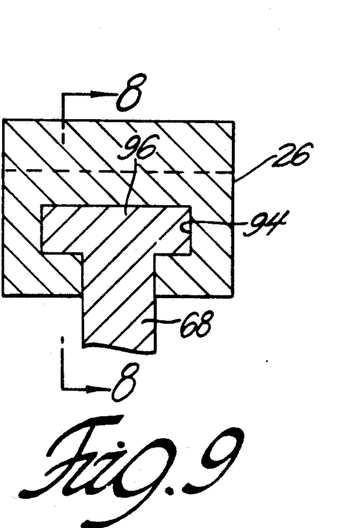
FIG. 9 is a detail view of the connection between an upright and a rack of the FIG. 5 panel.

Racks 26 and 28 are slidingly engaged respectively to the upper and lower ends of upright 60. The details of the sliding engagement between upright 60 and the racks are omitted from FIG. 5 in order to simplify that figure, but these details are shown by FIGS. 8 and 9. The sliding engagement allows racks 26 and 28 to translate inboard and outboard respectively during retraction or deployment of expansion unit 24. Between uprights 58 and 60 are translatable intermediate uprights 66 and 68, which are slidingly engaged to racks 26 and 28 in the same fashion as inboard upright 60. Uprights 66 and 68, unlike upright 60, are mobile relative to trailer 10.

Still referring to FIG. 5, it will be seen that all of the uprights are connected by a linkage subassembly 70. Subassembly 70 comprises a parallelogram formed by four elongate, bar-shaped linkage members 72 connected pivotally by joints 74, 76, 78 and 80 at the corners of the parallelogram. Joint 74 is attached to upright 58 so that the pivot axis of joint 74 is fixed relative to upright 58 but the members 72 connected by joint 74 can move relative to upright 58. Likewise, joint 78 is attached to upright 60 so that the pivot axis of joint 78 is fixed relative to upright 60, but the members 72 connected by joint 78 can move relative to upright 60. Subassembly 70 further comprises elongate carriages, as at 82, attached to intermediate uprights 66 and 68 and slidable therealong. Members 72 are swingably connected to the carriages by pivot pins such as that shown at 84. Alternatively, it is possible to have carriage members 82 slidingly mounted to members 72 and pivotally connected to the intermediate uprights.

Figure 6:
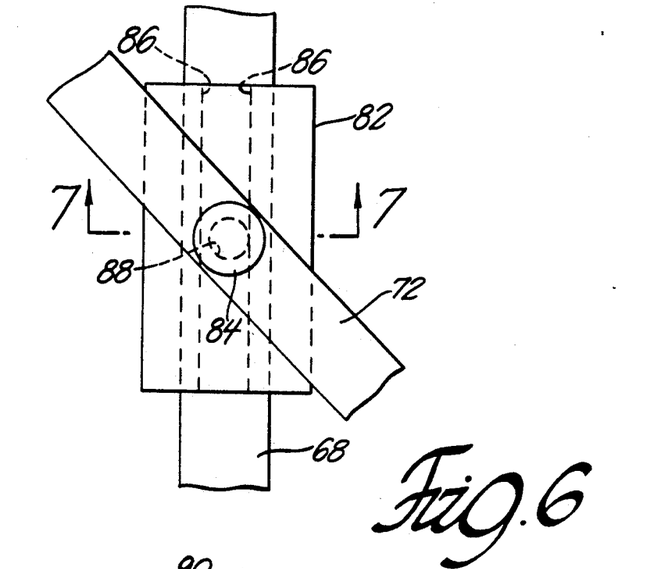
FIG. 6 is a detail view of a connection between an element of the linkage subassembly and an upright of panel in FIG. 5.
Figure 7:
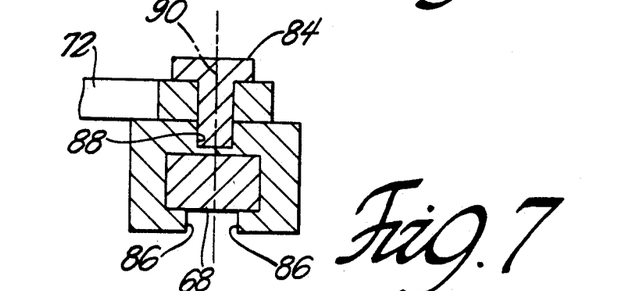
FIG. 7 is a view taken along line 7—7 in FIG. 6.

The connections between linkage member 72, carriage 82 and upright 68 are shown in greater detail in FIGS. 6 and 7, where it can be seen that upright 68 acts as a rail upon which rides carriage 82. Carriage 82 has the general shape of an elongate rectangular channel closely but slidingly fit onto upright 68, carriage 82 held on the upright by flanges 86. The shank of pivot pin 84 is press fit into recess 88 defined by carriage 82, but pin 84 may alternately be threadingly engaged to carriage 82 or bonded to the carriage by adhesive. As seen in FIG. 7, axis 90 is both the longitudinal axis of pin 84 and the pivot or swing axis of linkage member 72 as that member pivots on pin 84.

Figure 10:
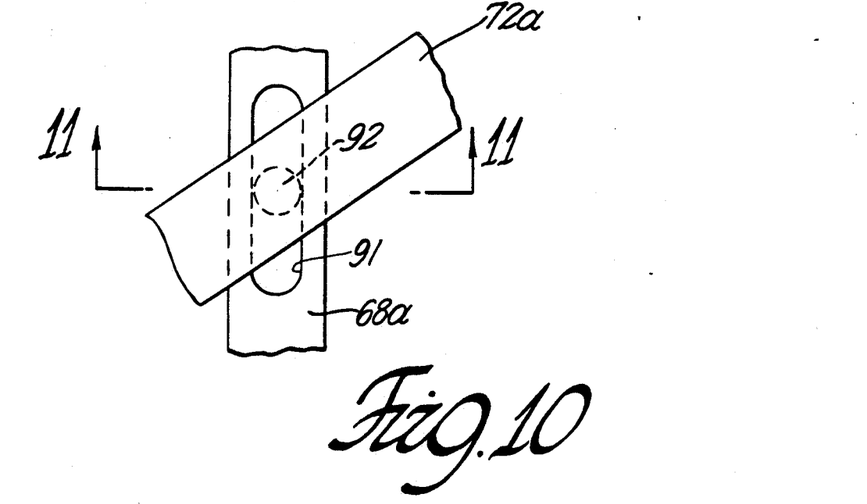
FIG. 10 is an alternate structure for the connection shown in FIG. 6.
Figure 11:
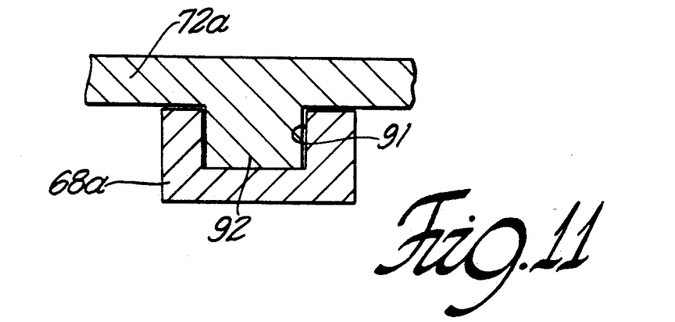
FIG. 11 is a view taken along line 11—11 in FIG. 10.

An alternate for the connection between member 72 and upright 68 is shown in FIGS. 10 and 11, wherein linkage member 72a is analogous to member 72 and upright 68a is analogous to upright 68. Upright 68a defines an elongate oval slot 91 in which closely and slidingly fits a circular boss 92. Boss 92 may be fixed to member 72a by any conventional means and may be integral with member 72a as shown in FIGS. 10 and 11. Optionally, the elongate slot can be defined by member 72a and the boss can be on upright 68a.

Details of the sliding engagement between intermediate upright 68 and rack 26 are shown by FIGS. 8 and 9, the sliding engagement between upright 68 and rack 28 being the same as shown by these figures. Likewise, the sliding engagement between the ends of intermediate upright 66 or inboard upright 60 and the racks are the same as the sliding engagement between the upright 68 and the racks. The sliding engagement is accomplished by means of a cross-sectionally T-shaped key way 94 defined by and running along upright 68. An elongate, complimentarily cross-sectionally T-shaped terminus or key 96 of upright 68 fits closely within key way 94 and slides along the key way. As shown in FIG. 8, the length dimension of key 96 is parallel to the key way.

Figure 3:
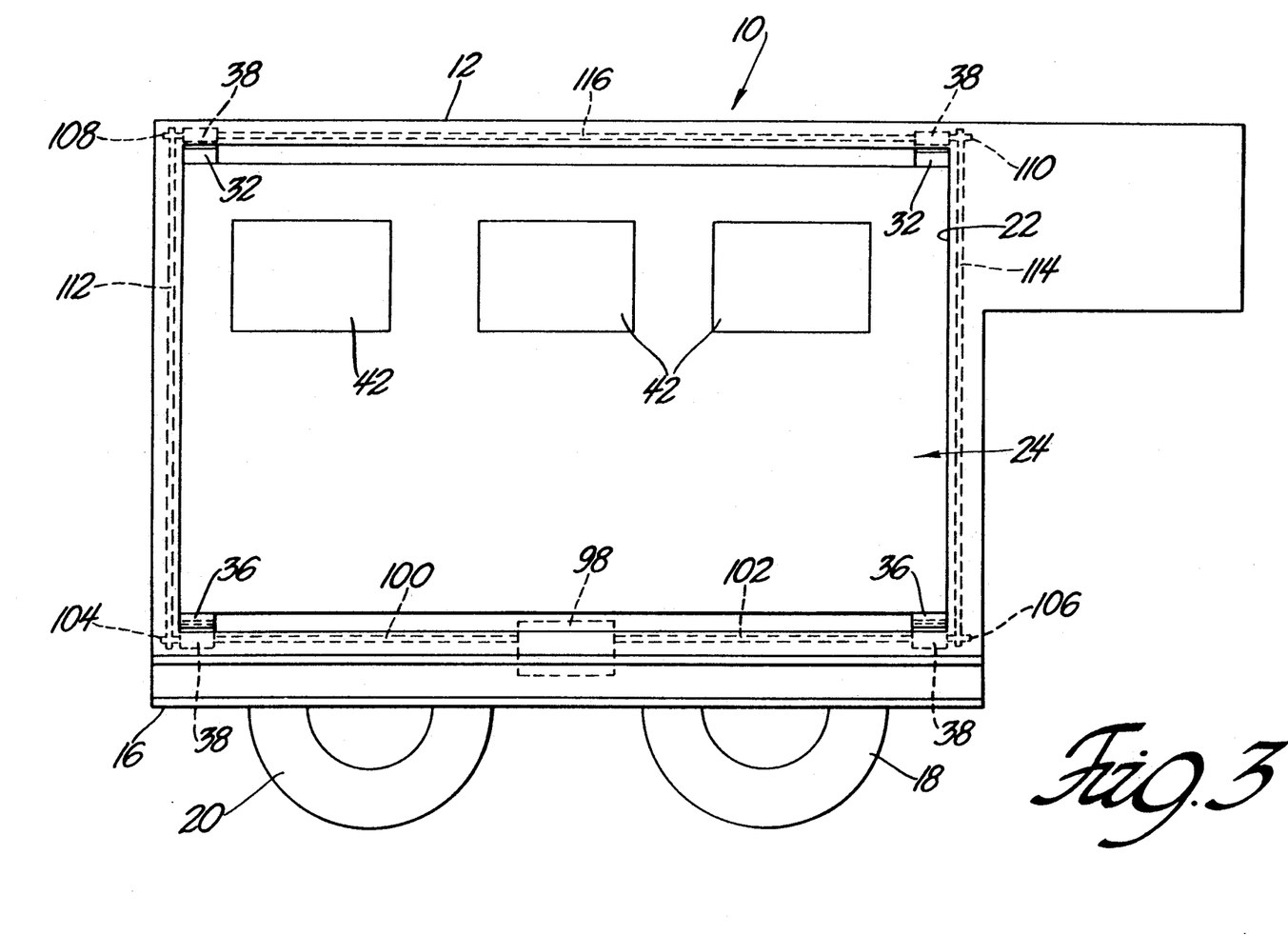
FIG. 3 is a side elevational view of the trailer showing the location of drive mechanism elements in the trailer.

In FIG. 3 is shown the location within trailer 10 of the components of the driving mechanism which translates expansion unit 24 outboard or inboard respectively for that unit's deployment or retraction. The preferred power source is a reversible electric motor 98 located inside trailer 10 at the bottom edge of rectangular opening 22. Motor 98 turns transfer shafts 100 and 102, which are connected to the gears 38 disposed at lower corners of opening 22. The gears at the lower corners drive the lower racks 28, the outboard ends 36 of the lower racks being visible in FIG. 3. Coaxially fixed to the gears at the lower corners are lower stub shafts 104 and 106 that are connected to analogous upper stub shafts 108 and 110 by drive loops 112 and 114, which can be conventional drive belts or drive chains. Upper stub shafts 108 and 110 are coaxially fixed to the gears 38 located at the upper corners of rectangular opening 22, and these gears are solidly connected together by control shaft 116 so that these gears rotate in unison. Because of drive loops 112 and 114, the gears 38 at the lower corners of opening 22 rotate in unison with the gears 38 at the upper corners of opening 22.

Normally expansion unit 24 is supported only by gears 38 when the expansion unit is in the FIG. 1, retracted position or when the expansion unit is translating outboard during its deployment. After expansion unit 24 is deployed, it will be vertically supported by any suitable means, such as removable stanchion post 118 in FIG. 4. It may be desired in some cases, however, to provide support in addition to gears 38 either when unit 24 is being deployed or retracted, or when unit 24 is in the fully retracted (FIG. 1) position.

Figure 4:
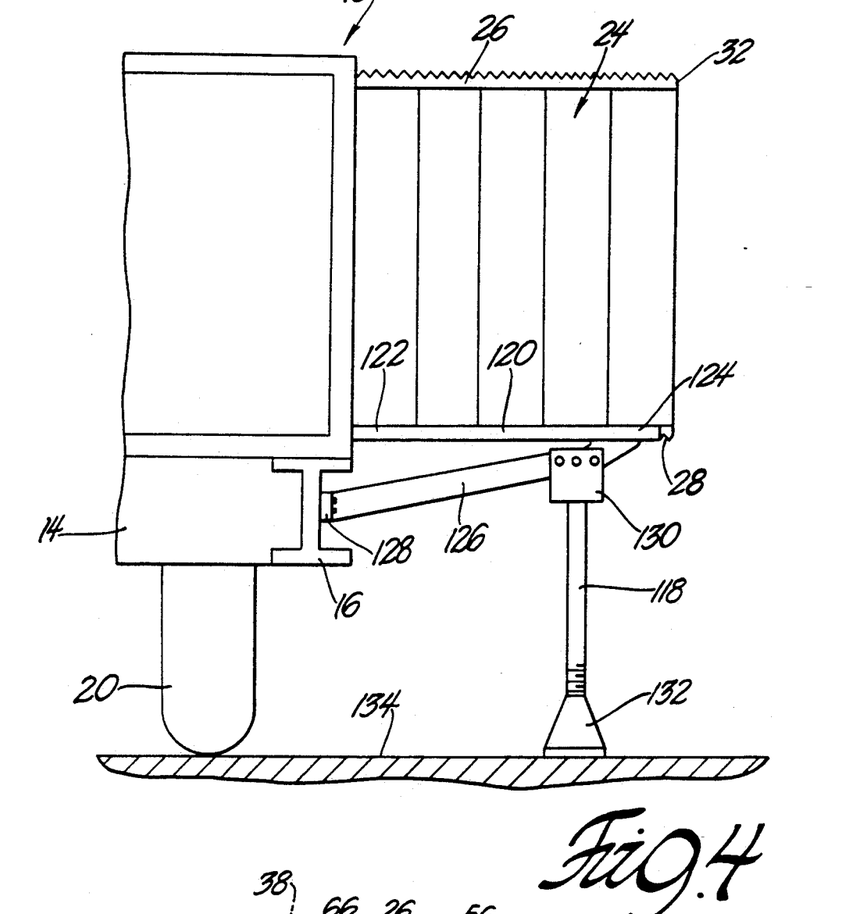
FIG. 4 is a partial rear elevational view of trailer 10 showing optional structure for supporting the expansion unit when the unit is deployed.

Means for supporting expansion unit 24 during deployment are illustrated in FIG. 4 wherein one or more guide beams 120 are disposed between and parallel to lower racks 28, one of racks 28 omitted from FIG. 4 in order to more clearly show beam 120. Guide beam 120 is positioned so that expansion unit 24 rests on and slides along the beam as the expansion unit deploys or retracts. Typically, inboard end 122 of beam 120 is not affixed to trailer 10 and need not contact trailer 10, although abutting contact between end 122 and the trailer may be preferable. Outboard end 124 of beam 120 is solidly fixed to truss 126, which is detachably fastened to frame member 16 at truss flange 128 by bolts or other removable fasteners. From the foregoing, it will be realized that guide beam 120 is a cantilever beam extending from truss 126 toward trailer 10.

Additional support for beam 120 may be provided by a stanchion assembly comprised of stanchion post 118, a bracket 130 fixed atop the post and adjustable foot 132 at the bottom of the post. Bracket 130 is detachably fastened to truss 126 by bolts or other removable fasteners. Bracket 130 optionally is detachably fastened to beam 120 instead of truss 126. Shoe 132 is threadingly engaged to the lower end of post 118, whereby rotating shoe 132 raises the shoe or lowers it so as to accommodate variation in level of surface 134 upon which trailer 10 rests.

Figure 12:
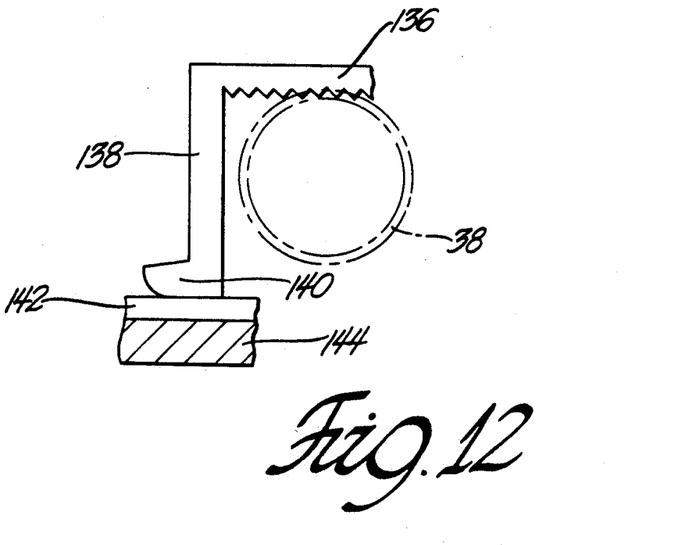
FIG. 12 is a detail view showing additional optional structure for supporting the expansion unit.

A means for supporting expansion unit 24 in the retracted position is shown in FIG. 12, this means also supporting unit 24 during deployment. In FIG. 12, lower rack 136 is in all respects the same as lower rack 28 except for modified inboard end 138, which terminates in slide foot 140. Engaging foot 140 is rail 142, which is disposed at least along the most inboard portion of the translational path of rack 136, whereby foot 140 rests upon rail 142 at least when expansion unit 24 is in its fully retracted position. Rail 142 is fixed to floor 144 or other structural member of trailer 24. During inboard or outboard translation of expansion unit 24, foot bears upon and slides along rail 142.

I wish it to be understood that I do not desire to be limited to the exact details of the construction shown and described herein since obvious modifications will occur to those skilled in the relevant arts without departing from the spirit and scope of the following claims.

I claim:

1. A vehicle having an expandable housing, comprising:
   a vehicle body defining an opening;
   an expansion unit translatable into and out of the opening;
   a first rack fixed to the expansion unit;
   a second rack fixed to the expansion unit parallel to the first rack;
   a first gear rotatably mounted to the vehicle and engaged with the first rack;
   a second gear rotatably mounted to the vehicle and engaged with the second rack;
   a panel disposed between the first rack and the second rack;
   a first elongate member of the panel fixed between the racks;
   a second elongate member of the panel fixed to the trailer and connected between the racks such that the racks slide on the second elongate member;
   a third elongate member of the panel slidingly connected between the racks and disposed between the first elongate member and the second elongate member, the third elongate member being mobile relative to the vehicle;
   a flexible wall of the panel bordered by the racks, and engaged to the first elongate member and the second elongate member.

2. The vehicle of claim 2 wherein the panel further includes a linkage subassembly, the linkage subassembly comprising:
   a first linkage member pivotally connected to the first elongate member;
   a second linkage member pivotally connected to the second elongate member;
   a pivotal connection between the first linkage member and the second linkage member;
   a translatable carriage member engaging both the third elongate member and one of the linkage members.

3. The vehicle of claim 2 wherein:
   the third elongate member has a carriage engagement portion whose cross section is rectangular;
   the carriage member defines an elongate channel closely fit to the carriage engagement portion;
   the carriage member is pivotally connected to the one linkage member.

4. The vehicle of claim 2 wherein:
   the carriage member has an engagement portion whose cross section is rectangular;
   the third elongate member defines an elongate channel closely fit to the engagement portion;
   the carriage member is pivotally connected to the one linkage member.

5. The vehicle of claim 2 wherein:
   the third elongate member defines an elongate slot therein;
   the carriage member is a circular boss on the one linkage member, the boss sliding in the slot and closely fit between sidewalls of the slot.

6. The vehicle of claim 2 wherein:
   the one linkage member defines an elongate slot therein;
   the carriage member is a circular boss on the third elongate member, the boss sliding in the slot and closely fit between sidewalls of the slot.

7. The vehicle of claim 1 wherein means for slidingly connecting the elongate members between the racks comprises an elongate key fit closely in and parallel to a key way.

8. The vehicle of claim 1 wherein the gears are means for supportingly mounting the expansion unit translatably to the vehicle.

9. The vehicle of claim 1 wherein a means for driving the gears includes coordination means for driving the gears in unison.

10. The vehicle of claim 1 further comprising:
    a floor fixed to the vehicle;
    a rail on the floor oriented along a translational path of the first rack;
    an interior end of the first rack located within the vehicle;
    a foot on the interior end slidingly engaged to the rail.

11. The vehicle of claim 1 wherein:
    the expansion unit has a first position where the expansion unit is retracted with respect to the vehicle;
    the expansion unit has a second position where the expansion unit is disposed more outward relative to the vehicle than during the first position;
    the vehicle includes a cantilevered beam supporting the expansion unit during the second position.

12. The vehicle of claim 11 further comprising:
    a free end of the beam;
    an opposing end of the beam further from the vehicle than the free end of the beam, the opposing end fixed relative to the vehicle.

13. The vehicle of claim 12 further comprising:
    a ground engagement stanchion;
    a solid connection between the stanchion and the beam at the opposing end of the beam.

14. The vehicle of claim 13 further comprising a truss detachably fixed to the vehicle and detachably fixedly connected to the stanchion.

15. The vehicle of claim 1 wherein the racks and the first elongate member are frame members rigidifying the expansion unit.

16. An enclosure having an expandable housing, comprising:
    a body defining an opening;
    an expansion unit translatable into and out of the opening;
    a rack fixed to the expansion unit;
    a gear rotatably mounted to the enclosure and engaged with the rack;
    a panel disposed the rack;
    a first elongate member of the panel fixed on the rack;
    a second elongate member of the panel fixed to the enclosure and connected to the rack such that the rack slides on an end of the second elongate member;
    a third elongate member of the panel slidingly connected the rack and disposed between the first elongate member and the second elongate member, the third elongate member being mobile relative to the enclosure;
    a flexible wall of the panel whose edges run along the rack, the first elongate member and the second elongate member.

17. The vehicle of claim 16 wherein:

the expansion unit has a first position where the expansion unit is retracted with respect to the enclosure;

the expansion unit has a second position where the expansion unit is disposed more outward relative to the enclosure than during the first position;

the enclosure includes a cantilevered beam supporting the expansion unit during the second position.

18. The vehicle of claim 17 further comprising:
a free end of the beam;
an opposing end of the beam further from the vehicle than the free end of the beam.

19. The vehicle of claim 1 wherein the rack and the first elongate member are frame members rigidifying the expansion unit.

* * * * *